Sept. 4, 1962  L. L. BELTZ  3,052,175
ELECTRICAL SYSTEM

Filed Oct. 8, 1958  2 Sheets-Sheet 1

L. L. BELTZ
INVENTOR.

BY  E. C. McRae
    J. H. Oster
    K. L. Zerschling
ATTORNEYS

Sept. 4, 1962  L. L. BELTZ  3,052,175
ELECTRICAL SYSTEM

Filed Oct. 8, 1958  2 Sheets-Sheet 2

L. L. BELTZ
INVENTOR.

BY E. C. McRae
J. H. Oster
K. L. Zerschling
ATTORNEYS

United States Patent Office 3,052,175
Patented Sept. 4, 1962

3,052,175
ELECTRICAL SYSTEM
Lester L. Beltz, Birmingham, Mich., assignor to Ford Motor Company, Dearborn, Mich., a corporation of Delaware
Filed Oct. 8, 1958, Ser. No. 766,113
8 Claims. (Cl. 98—2)

This invention relates to an automotive electrical system and more particularly to means for controlling a two speed electrical device associated with said automotive electrical system. This application is a continuation in part of my copending application Serial Number 535,726, filed September 21, 1955, now abandoned.

Although by no means so limited, the present invention is particularly applicable for controlling electrical components of a vehicle ventilating and heating or cooling system and will be described in relation thereto. Recent changes in the design and geometry of motor vehicles has rendered it impractical to utilize the so-called ram effect of the moving vehicle to generate the necessary air pressure differential to accomplish the ventilation of the vehicle. Prevously this ram effect has been relied upon to do the bulk of the air circulation necessary for vehicle heating, cooling and ventilating. This lack of availability of ram air has necessitated the provision of a blower capable of providing substantially the same volume of air at a comparable pressure. Since the energy contained in any given column of air varies with the cube of the in velocity, it is apparent that a substantial expenditure of power is involved in ventilating a car in which a blower has supplanted the use of ram air.

This invention has been perfected to permit a substantially larger blower to be operated from the existing electrical system of automotive vehicles and is best understood by references to the figures of the annexed drawing in which.

This invention may be practiced with any type of electrical motor in which some parameter of the motor may be varied to cause the motor to draw less current from a constant voltage source as the speed is lowered. If it is desired to use a shunt motor, the field may be permitted to remain constant and a resistance inserted in the armature circuit to lower the speed and current consumption. Conversely in a shunt machine a high speed and high current consumption may be obtained by placing a resistance in series with the field and then shunting this resistance to lower the speed and current drain. If it is desired to employ a series motor, low speed and low current drain may be obtained by permitting the load current to flow through the entire field circuit and higher speeds obtained by shunting out of the circuit a part of the field windings. It is apparent that many variations of these expedients will suggest themselves to those skilled in the art.

Figure 1:
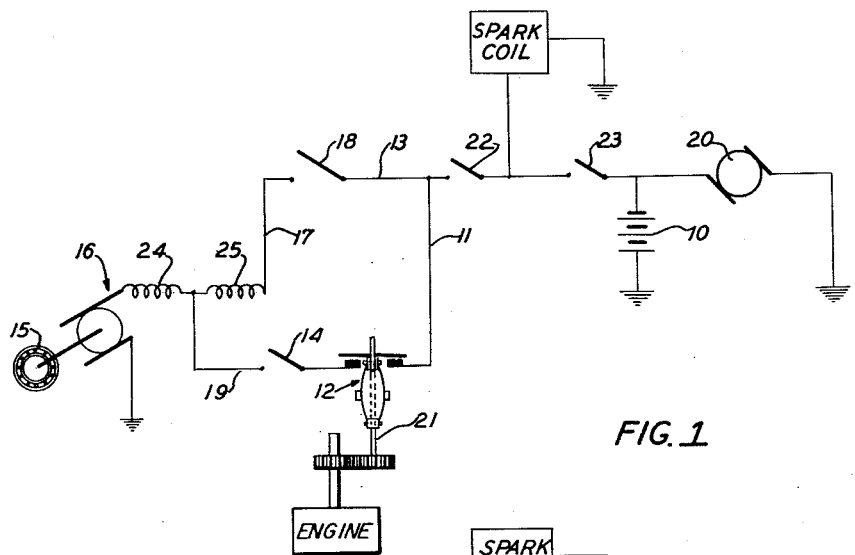
FIGURE 1 is a schematic drawing of one embodiment of the invention.

Referring now to the drawings in which like reference numerals designate like components throughout the several views thereof, there is shown in FIGURE 1 an elecrical system energized by a battery 10 which is charged by generator 20. An electrical power means such as a two speed motor 16 which may drive a blower 15, is energized by battery 10 and generator 20 through conduits 11, 13, 17 and 19 and is controlled by high speed switch 14, low speed switch 18 and a speed responsive switch 12. Speed responsive switch 12 is driven by flexible cable 21. Flexible cable 21 is driven by a vehicle mechanism the speed of which is a function of the engine speed of the vehicle. The motor 16 is also controlled by a switch 22. In most cases it is desired to have the motor 16 also controlled by ignition switch 23.

Users of motor vehicles have been accustomed by long usage to large amounts of ventilating and heating or cooling air only at times when the vehicle is in motion. To supply by a blower air flows comparable to that obtained by the ram phenomenon would normally impose requirements upon the electrical system in general and particularly upon the generator and battery which present vehicle systems would be unable to sustain. To be able to carry the load imposed by a large blower under all circumstances and driving conditions a much larger generator would have to be installed and one which would have sufficient capacity to support the operation of this blower at idling conditions.

To avoid this expense the system depicted in FIGURE 1 has been devised where the motor 16, which may drive the blower 15, is controlled by a low speed switch 18 and a high speed switch 14. The high speed switch 14 is in series with the speed responsive switch 12 which may be of the centrifugal type. The speed responsive switch 12 is arranged to close when the speed of the mechanism to which cable 21 is attached has reached a rotative speed which will insure that the generator 20 will be rotating sufficiently rapidly to carry a full load. For example, the cable 21 may be operatively connected to the generator of the vehicle so that the switch 12 will close when the speed of the generator is such to insure that the generator is contributing substantial amounts of energy to the electrical system of the vehicle. The cable 21 may be driven by any rotating mechanism of the vehicle, the speed of which is a function of the engine speed. As a typical example, the cable 21 may be connected to the rear wheels of the automobile so that the switch 12 will close when the rear wheels have reached a rotative speed which will insure that in high gear or the driving range generator 20 will be rotating sufficiently rapidly to contribute substantial amounts of electrical energy to the system.

The field of the motor 16 is split into two parts, 24 and 25. To obtain low speed operation of the motor 16 and blower 15 driven thereby, the operator must close the ignition switch 23, switch 22 and the low speed switch 18. The switch 14 must be left in the open position. In this case the motor 16 is energized from the battery 10 and/or generator 20 in such a way that the two parts of the motor field 24 and 25 are connected in series. To obtain high speed operation of the system the operator closes the switch 14 and when the engine speed has reached a condition such that the generator 20 is contributing substantial amounts of electrical energy to the system the switch 12 will close, shunting the motor field part 25, thereby decreasing the flux in the motor and increasing its speed.

Thus the effect of the embodiment of the invention of FIGURE 1 is to automatically change the speed of the two speed motor 16 whenever the generating capacity of the generator is sufficient to fully energize the motor 16.

Figure 2:
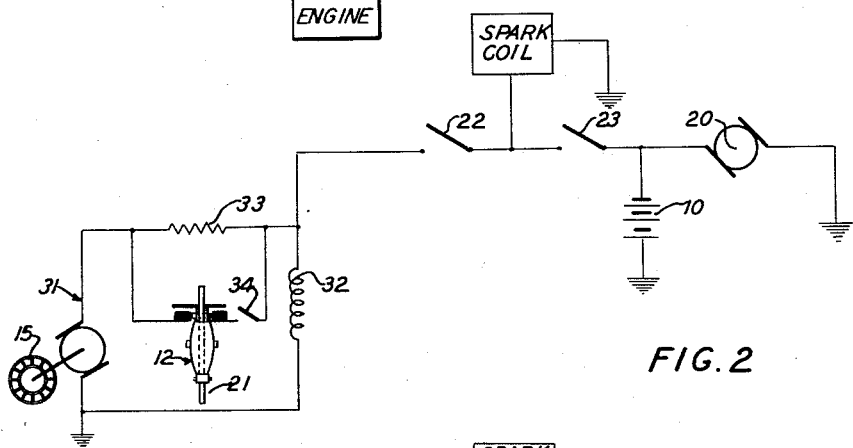
FIGURE 2 is a schematic drawing of the second embodiment of the invention.

Referring now to FIGURE 2, there is shown a system substantially similar to the embodiment of FIGURE 1 but which utilizes a shunt motor 31 rather than the series motor 16. This motor has a parallel field winding 32 and a series resistor 33 which is normally connected in series with the armature of the motor during low speed operation. During low speed operation the switches 22 and 23 are closed and the motor 31 is energized from the battery 10 and/or generator 20. A portion of the energizing current flows to ground through the parallel field winding 32, while another portion of the current flows through series resistor 33 and the armature of the motor to ground. When high speed operation of the motor is desired, a high speed switch 34 is closed. The speed responsive switch 12 which is driven by the cable 21 is similar to that employed in the embodiment in FIGURE 1 but is adapted to shunt out the series resistor 33 when the proper engine speed has been obtained. It is readily apparent from an inspection of FIGURE 2 that when the high sped switch 34 is closed and the speed responsive switch 12 is closed that the series resistor 33 is shunted out of the system, thereby sending an increased current through the armature of the motor 31. This effectively changes the speed of the motor 31 from its lower speed to its higher speed.

Figure 3:
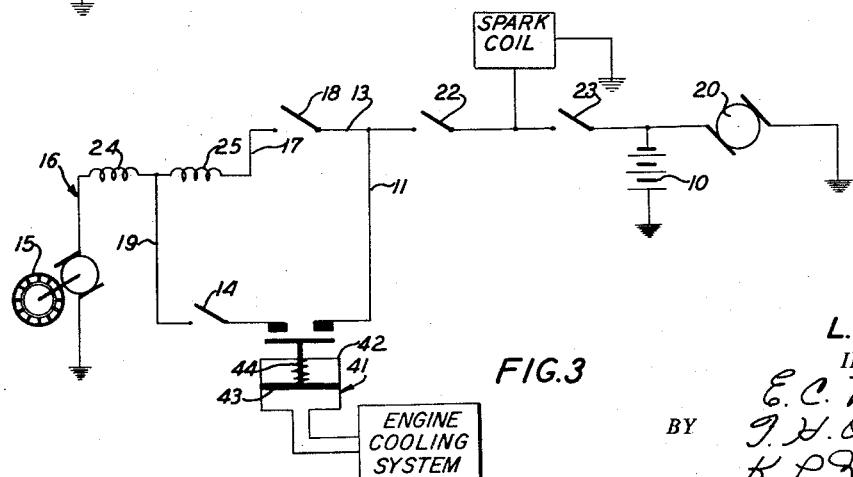
FIGURE 3 is a schematic drawing of the third embodiment of the invention.

Referring now to FIGURE 3, there is shown an embodiment of the invention which is in all respects the same as FIGURE 1 with the exception of the speed responsive switch 12. In this embodiment of the invention there is employed a pressure responsive switch 41 which comprises a casing 42 having a piston 43 positioned therein. A spring 44 is positioned between the top of the piston and the casing to bias the switch to the open position as shown. The bottom of the casing may be connected to a source of fluid under pressure. The pressure of this fluid must be a function of the engine speed of the vehicle and it is preferred to connect the switch to the water pump casing as the water pump delivers a fluid under pressure which increases as the engine speed increases. The parameters of the switch are arranged so that the switch will close when the generator 20 reaches a speed where it is capable of contributing substantial amounts of electrical energy to the system.

Figure 4:
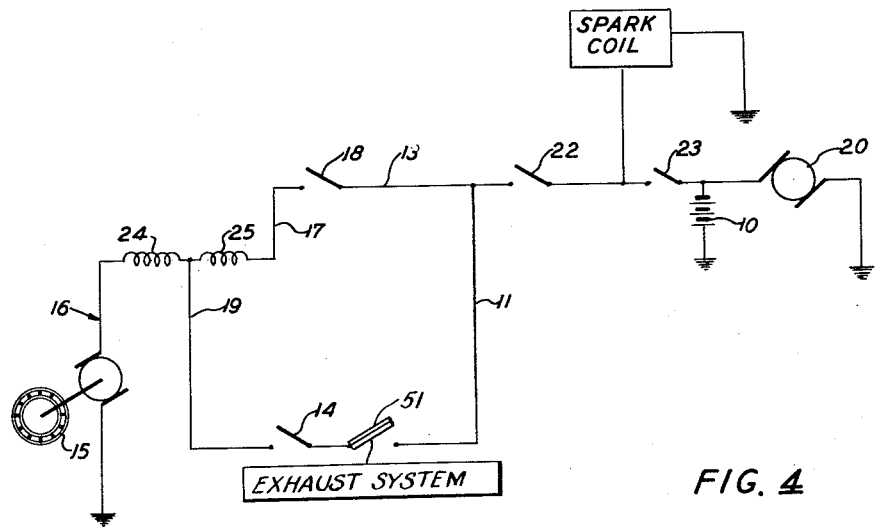
FIGURE 4 is a schematic drawing of the fourth embodiment of the invention.

FIGURE 4 discloses an embodiment of the invention which is similar to FIGURES 1 and 3, with the exception of the switch mechanism employed. This embodiment employs a thermostatic switch which may be of the bimetallic type, as shown at 51. This thermostatic switch is placed in a position to sense the temperature of a component part of the automotive vehicle which is a function of the engine speed. For example, this thermostatic switch may be positioned to sense the temperature of any portion of the exhaust system, the temperature of which is known to be a function of engine speed. Again, with this embodiment the parameters are so arranged that the thermostatic switch 51 will close when the speed of the engine is such that the generator 20 is capable of contributing substantial amounts of electrical energy to the system.

Figure 5:
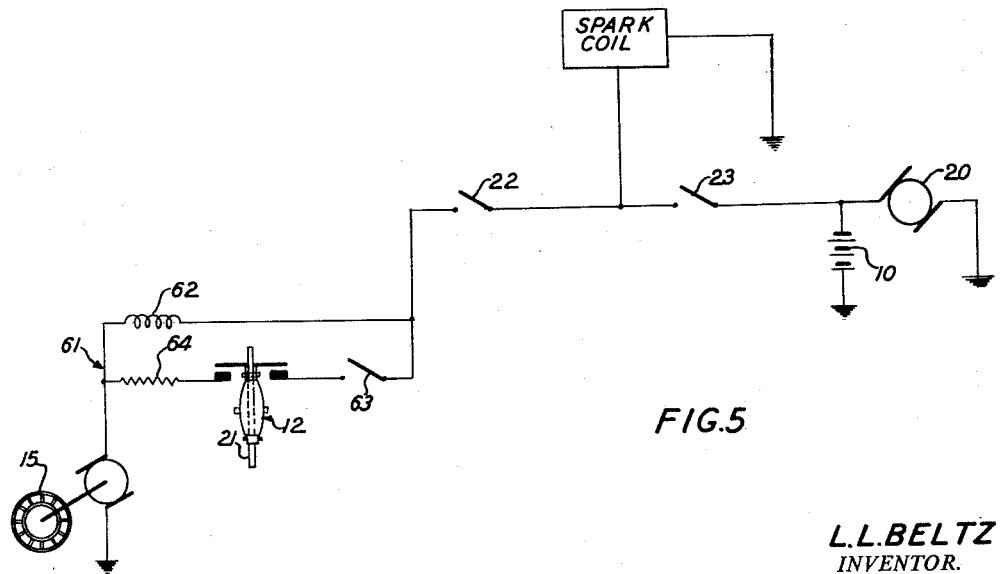
FIGURE 5 is a schematic drawing of a fifth embodiment of the invention.

FIGURE 5 discloses another embodiment of the invention in which a sped responsive switch may be readily employed. This embodiment employs electrical motor 61 which has a series field coil 62 in series with the armature thereof. For low speed operation the switches 23 and 22 are closed and a high speed switch 62 which is connected in series with the speed responsive switch 12 and a resistor 64 is open. Thus the total current which passes through the switch 22 flows through the series field coil 62 and the armature of the motor 61. For high speed operation the switch 63 is closed, and, as in the case of the other embodiments of the invention, when the mechanism to which the cable 21 is attached has reached a speed such that the generator 20 is contributing substantial amounts of electrical energy to the system, the switch 12 closes, thereby inserting the resistor 64 in parallel with the series coil 62. This action reduces the current flowing through the series field coil 62 but does not diminish the current flowing in the armature of the motor. This increases the speed of the motor since it reduces the flux density generated by the field coil 62.

It is readily apparent that although speed responsive switches are shown with the embodiments of FIGURES 1, 2 and 5 that any other switch which is responsive to a condition which is a function of engine speed may be employed. For example, the pressure responsive switch of FIGURE 3 or the thermostatic switch 51 of FIGURE 4 may be used with the embodiments of the invention shown in FIGURES 2 and 5. It is also understood that while the invention discloses a two speed motor driving a blower that the invention is equally applicable to any two sped electrical device.

When the invention is employed with a ventilating system of an automotive vehicle, the occupants of the vehicle will have available adequate ventilation under circumstances identical to which they have become accustomed and this adequate ventilation will be available without substantial alteration of the electrical system or the overload of any of its components.

It will be understood that the invention is not to be limited to the exact construction shown and described, but that various changes and modifications may be made without departing from the spirit and scope of the invention, as defined in the appended claims.

I claim as my invention:

1. In an automobile including an engine, an electrical system circuit comprising a battery, a generator driven by said engine, an electrically driven two speed device, means positioned in said circuit for energizing said device to operate at the lower speed, and means positioned in said circuit and responsive to a condition which is a function of the speed of said engine for energizing said device to operate at the higher speed when the speed of the engine is such that the generator is capable of contributing substantial amounts of electrical energy to said system.

2. In an automobile including an engine, an electrical circuit system comprising a battery, a generator driven by said engine, a blower, an electrical power means for driving said blower at two speeds, said electrical power means operatively coupled to said blower, a first electrical switch connected in circuit with said battery, generator and electrical power means for energizing said electrical power means to operate at the lower speed of said two speeds, a second electrical switch connected in circuit with said battery, generator and electrical power means to energize said electrical power means to operate at the higher speed, and said second switch responsive to a condition which is a function of the speed of said engine, said second switch adapted to be actuated to operate said electrical power means when the speed of said engine is such that the generator is capable of contributing to the system substantial amounts of electrical energy.

3. In an automobile including an engine, an electrical circuit system comprising a battery, a generator driven by said engine, an electrically driven two speed device, a first electrical switch connected in said circuit for energizing said device to operate at the lower speed, a speed responsive electrical switch connected in circuit with said battery, generator and two speed device to operate said two speed device at the higher speed, said switch operatively coupled to a part of the automobile that produces a signal proportional to the speed of said engine, said switch adapted to be actuated when the speed of said engine is such that the generator is capable of contributing to the system substantial amounts of electrical energy.

4. In an automotive vehicle having an engine, wheels drivingly connected to said engine and an automotive electrical system the combination comprising a generator, a battery, an electrically driven ventilation blower comprising a blower, an electrical power means for driving said blower, a high speed section in circuit with said electrical power means and a low speed section in circuit with said electrical power means, and an electrical switch intermediate said generator and battery and only the high speed section of said electrically driven ventilation blower, said electrical switch being responsive to the wheel speed of the vehicle and permitting energization of the high speed section of the electrically driven ventilation blower only when the speed of the vehicle is such that the generator is capable of contributing to the system substantial amounts of electrical energy, the low speed section of the electrically driven ventilation blower being independent of control by the speed responsive electrical switch.

5. In an automobile including an engine with a water pump, an automotive electrical system comprising a battery, a generator, an electrically driven two speed device, means positioned in said circuit for energizing said device to operate at the lower speed, a pressure responsive switch positioned in said circuit and responsive to the pressure of the fluid pumped by said water pump for energizing said device to operate at the higher speed when the speed of the engine is such that the generator is capable of contributing substantial amounts of electrical energy to said system.

6. In an automobile including an engine having an exhaust system, an automotive electrical system comprising a battery, a generator, an electrically driven two speed device, means positioned in said circuit for energizing said device to operate at the lower speed, and a thermostatic switch positioned in said circuit and responsive to the temperature of the exhaust system for energizing said device to operate at the higher speed when the speed of the engine is such that the generator is capable of contributing substantial amounts of electrical energy to said system.

7. In an automobile including an engine, an automotive electrical system comprising a battery, a generator, an electrical two speed motor, said motor including an armature, a shunt field winding and a resistance in series with said armature, means positioned in said circuit for energizing said motor, and means positioned in said circuit and responsive to a condition which is a function of the speed of said engine for shunting out said resistor when the speed of the engine is such that the generator is capable of contributing substantial amounts of electrical energy to said system.

8. In an automobile including an engine, an automotive electrical system comprising a battery, a generator, an electrical two speed motor, said motor comprising an armature and a series field winding, means positioned in said circuit for energizing said motor, a resistor, and means positioned in said circuit and responsive to a condition which is a function of the speed of said engine for placing said resistor in parallel with said series field winding when the speed of the engine is such that the generator is capable of contributing substantial amounts of electrical energy to said system.

References Cited in the file of this patent

UNITED STATES PATENTS

| | | |
|---|---|---|
| 1,091,012 | Pachaly | Mar. 24, 1914 |
| 1,651,356 | Ananson | Dec. 6, 1927 |
| 1,941,363 | Norviel | Dec. 26, 1933 |

FOREIGN PATENTS

| | | |
|---|---|---|
| 1,067,314 | France | June 15, 1954 |
| 783,757 | Great Britain | Sept. 25, 1957 |